(12) United States Patent
Yamada et al.

(10) Patent No.: US 9,836,044 B2
(45) Date of Patent: Dec. 5, 2017

(54) MACHINING TIME ESTIMATING DEVICE FOR ESTIMATING MACHINING TIME AFTER MODIFICATION OF NC PROGRAM

(71) Applicant: FANUC Corporation, Minamitsuru-gun, Yamanashi (JP)

(72) Inventors: Hiroshi Yamada, Minamitsuru-gun (JP); Kazuhiko Morisaki, Minamitsuru-gun (JP)

(73) Assignee: FANUC CORPORATION, Minamitsuru-gun, Yamanashi (JP)

( * ) Notice: Subject to any disclaimer, the term of this patent is extended or adjusted under 35 U.S.C. 154(b) by 341 days.

(21) Appl. No.: 14/798,748

(22) Filed: Jul. 14, 2015

(65) Prior Publication Data

US 2016/0026167 A1  Jan. 28, 2016

(30) Foreign Application Priority Data

Jul. 28, 2014  (JP) .................. 2014-153232

(51) Int. Cl.
*G05B 19/418* (2006.01)
(52) U.S. Cl.
CPC .......... *G05B 19/41865* (2013.01); *G05B 2219/31407* (2013.01); *G05B 2219/31412* (2013.01); *Y02P 90/20* (2015.11)
(58) Field of Classification Search
CPC .... G05B 19/41865; G05B 2219/31407; G05B 2219/31412; Y02P 90/20

USPC ......................................... 700/174
See application file for complete search history.

(56) References Cited

U.S. PATENT DOCUMENTS

| 2002/0166112 | A1* | 11/2002 | Martin | G06F 11/3447 |
| | | | | 717/124 |
| 2006/0065638 | A1* | 3/2006 | Sasaki | B23H 7/20 |
| | | | | 219/69.13 |
| 2011/0113224 | A1* | 5/2011 | Isshiki | G06F 11/3419 |
| | | | | 712/240 |
| 2012/0109359 | A1* | 5/2012 | Mizuno | G05B 19/41865 |
| | | | | 700/173 |

FOREIGN PATENT DOCUMENTS

JP  2012-093975 A  5/2012

* cited by examiner

*Primary Examiner* — Sean Shechtman
*Assistant Examiner* — Michael W Choi
(74) *Attorney, Agent, or Firm* — Drinker Biddle & Reath LLP (57) ABSTRACT

An arithmetic processing unit divides a modified NC program into a plurality of segments and determines a machining time estimation target segment among the plurality of divided segments. When estimating the machining time required for the machining of a machine tool controlled based on the modified NC program, the arithmetic processing unit shortens the time required for the machining time estimation process by reutilizing an estimated machining time for an NC program before modification with respect to segments other than the machining time estimation target segment.

6 Claims, 9 Drawing Sheets

| PROGRAM TEXT SEGMENT | TIME REQUIRED FOR ESTIMATION PROCESS (MINUTE) |
|---|---|
| SEGMENT 1 | 1 |
| SEGMENT 2 | 2 |
| SEGMENT 3 | 3 |
| SEGMENT 4 | 1 |
| ENTIRE NC PROGRAM (TOTAL) | 7 |

FIG. 6

| PROGRAM TEXT SEGMENT | TIME REQUIRED FOR ESTIMATION PROCESS (MINUTE) | |
|---|---|---|
| | BEFORE MODIFICATION (FIRST ROUND) | AFTER MODIFICATION (SECOND ROUND) |
| SEGMENT 1 | 1 | 1 |
| SEGMENT 2 | 2 | 2 |
| SEGMENT 3 | 3 | 3 |
| SEGMENT 4 | 1 | 1 |
| ESTIMATED PROCESSING TIME FOR ALL SEGMENTS | 7 | 7 |
| TOTAL OF TWO ROUNDS OF ESTIMATION EXECUTION | 14 | |

FIG. 7

| PROGRAM TEXT SEGMENT | TIME REQUIRED FOR ESTIMATION PROCESS (MINUTE) | |
|---|---|---|
| | BEFORE MODIFICATION (FIRST ROUND) | AFTER MODIFICATION (SECOND ROUND) |
| SEGMENT 1 | 1 | – |
| SEGMENT 2 | 2 | – |
| SEGMENT 3 | 3 | – |
| SEGMENT 4 | 1 | 1 |
| ESTIMATED PROCESSING TIME FOR ALL SEGMENTS | 7 | 1 |
| DIFFERENCE IN TIME REQUIRED FOR ESTIMATION PROCESS | −6 | |

| PROGRAM TEXT SEGMENT | TIME REQUIRED FOR ESTIMATION PROCESS (MINUTE) | |
|---|---|---|
| | BEFORE MODIFICATION (FIRST ROUND) | AFTER MODIFICATION (SECOND ROUND) |
| SEGMENT 1 | 1 | – |
| SEGMENT 2 | 2 | – |
| SEGMENT 3 | 3 | 3 |
| SEGMENT 4 | 1 | 1 |
| ESTIMATED PROCESSING TIME FOR ALL SEGMENTS | 7 | 4 |
| DIFFERENCE IN TIME REQUIRED FOR ESTIMATION PROCESS | –3 | |

FIG. 11

| PROGRAM TEXT SEGMENT | TIME REQUIRED FOR ESTIMATION PROCESS (MINUTE) | |
|---|---|---|
| | BEFORE MODIFICATION (FIRST ROUND) | AFTER MODIFICATION (SECOND ROUND) |
| SEGMENT 1 | 1 | – |
| SEGMENT 2 | 2 | – |
| SEGMENT 3 | 3 | 3 |
| SEGMENT 4 | 1 | – |
| ESTIMATED PROCESSING TIME FOR ALL SEGMENTS | 7 | 3 |
| DIFFERENCE IN TIME REQUIRED FOR ESTIMATION PROCESS | –4 | |

MACHINING TIME ESTIMATING DEVICE FOR ESTIMATING MACHINING TIME AFTER MODIFICATION OF NC PROGRAM

RELATED APPLICATION DATA

This application claims priority under 35 U.S.C. §119 and/or §365 to Japanese Application No. 2014-153232 filed Jul. 28, 2014, the entire contents is incorporated herein by reference.

BACKGROUND OF THE INVENTION

1. Field of the Invention

The present invention relates to a machining time estimating device for shortening the time required for estimating a machining time when a NC program is modified.

2. Description of the Related Art

An operator who creates or modifies a NC program may often want to check a machining time of the NC program as well as whether the NC program operates correctly after the NC program is created or modified.

This is because, when a machining is carried out by a target NC program, it is necessary to grasp the machining time in order to check when the preparation of the next machining is to be prepared or to estimate the number of works that can be processed on a fixed schedule or time to perform production planning.

In general, an operator repeats two operation of "creating or modifying an NC program" and "checking the execution time of the NC program" to optimize the NC program. Here, the followings may be used as a method of "checking the execution time of the NC program".

(1) A target NC program is executed using an actual machine tool.

(2) The execution time calculated when the NC program is created by a CAD/CAM system is used.

(3) Software for estimating a machining time of the NC program is used.

Here, the method (1) requires time the same as the execution time of the NC program in order to check the machining time and requires the machine tool to be operated actually in order to check the machining time. Thus, there is a problem in that the machine tool is exclusively used. Moreover, the method (2) calculates the time required for movement from a tool moving distance and a command transfer rate. Thus, there is a problem in that an acceleration/deceleration speed taken into consideration during operation of a numerical controller is not included in the estimated machining time and the error in the estimated machining time increases.

In contrast, Japanese Patent Application Laid-Open No. 2012-93975 discloses a technique of estimating a machining time of an NC program as an example of the method (3). This technique can estimate the machining time at a higher speed and higher accuracy than the methods (1) and (2) described above.

Figure 14:
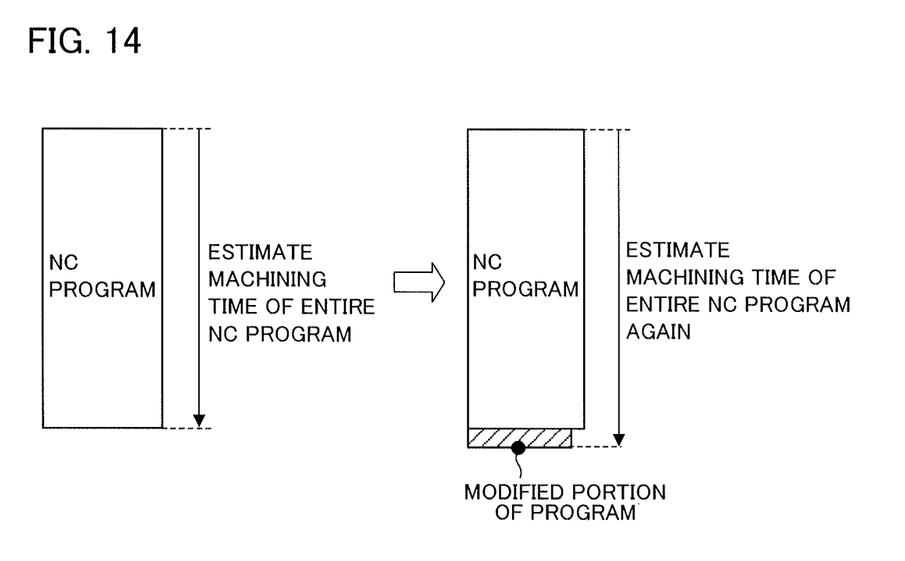
FIG. 14 is a diagram for describing the problem of a machining time estimation process according to an NC program in the related art.

However, in this technique, the target range of the "estimation of the machining time" of the NC program is all blocks ranging from the leading block of the NC program to the last block. Thus, there is a problem in that, when the NC program is long, the processing time for calculating the estimation result of the machining time also increases. Therefore, as illustrated in FIG. 14, even when only several blocks of an NC program are modified, the estimation processing time is always substantially the same. Thus, there is a problem, if the operations of "creating or modifying an NC program" and the operation of "estimating the machining time" are repeated several times in order to optimize the NC program, and when the NC program is long, in that the operation time consumed for optimization of the NC program increases remarkably.

SUMMARY OF THE INVENTION

Therefore, an object of the present invention is to provide a machining time estimating device capable of shortening the processing time for estimating the machining time after an NC program is modified.

A machining time estimating device according to the present invention estimates a machining time required for a machine tool to machine a workpiece, the machine tool being controlled based on an NC program, the machining time estimating device including: a storage unit that stores first segment information on a plurality of segments that forms a first NC program; a program dividing unit that divides a second NC program modified based on the first NC program into a plurality of segments, and generates second segment information on the plurality of segments; a segment relation specifying unit that specifies correlation between the plurality of segments that forms the first NC program and the plurality of segments that forms the second NC program, based on the first segment information and the second segment information; an estimation segment determining unit that determines a machining time estimation target segment among the plurality of segments that forms the second NC program; and a machining time estimating unit that estimates a machining time required for the machining of the machine tool controlled based on the second NC program. The first segment information includes an estimated machining time based on the plurality of segments for each of the plurality of segments that forms the first NC program. The machining time estimating unit is configured to estimate the machining time for a segment that is determined as the machining time estimation target segment by the estimation segment determining unit, and acquire the estimated machining time included in the first segment information with respect to segments that are determined as segments other than the machining time estimation target segment by the estimation segment determining unit, to thereby calculate a total machining time.

Each of the first and second items of segment information may include a leading program text of a segment corresponding to each of the first and second items of segment information, and the segment relation specifying unit may be configured to specify correlation between the plurality of segments that forms the first NC program and the plurality of segments that forms the second NC program, based on the leading program text.

Each of the first and second items of segment information may include an axial position of the machine tool at the start of execution of a leading block of a segment corresponding to each of the first and second items of segment information, and the segment relation specifying unit may be configured to specify correlation between the plurality of segments that forms the first NC program and the plurality of segments that forms the second NC program, based on the axial position of the machine tool at the start of execution of the leading block.

Each of the first and second items of segment information may include parity information of a program text of a segment corresponding to each of the first and second items of segment information, and the estimation segment determining unit may be configured to determine the machining time estimation target segment based on the parity information of the program text of the segment corresponding to each of the first and second items of segment information. In this case, the estimation segment determining unit may be configured to determine the machining time estimation target segment based on a modification content of the second NC program in addition to the parity information of the program text of the segment corresponding to each of the first and second items of segment information. Further, the estimation segment determining unit may be configured to determine the machining time estimation target segment based on the effect of a command corresponding to the modification content of the second NC program on a block subsequent to the command.

According to the present invention, when the NC program of which the machining time has been estimated once is modified, since the machining time for the NC program after modification is estimated using the estimation result of the machining time estimated using the NC program before modification, it is possible to shorten the time required for the machining time estimation process.

BRIEF DESCRIPTION OF THE DRAWINGS

The aforementioned and other objects and features of the present invention will become apparent from the following description of embodiments with reference to the accompanying drawings in which.

DESCRIPTION OF THE PREFERRED EMBODIMENTS

A machining time estimating device according to the present invention is configured as an arithmetic processing unit such as a computer. The arithmetic processing unit that forms the machining time estimating device according to the present invention will be described with reference to the block diagram of FIG. 1.

Figure 1:
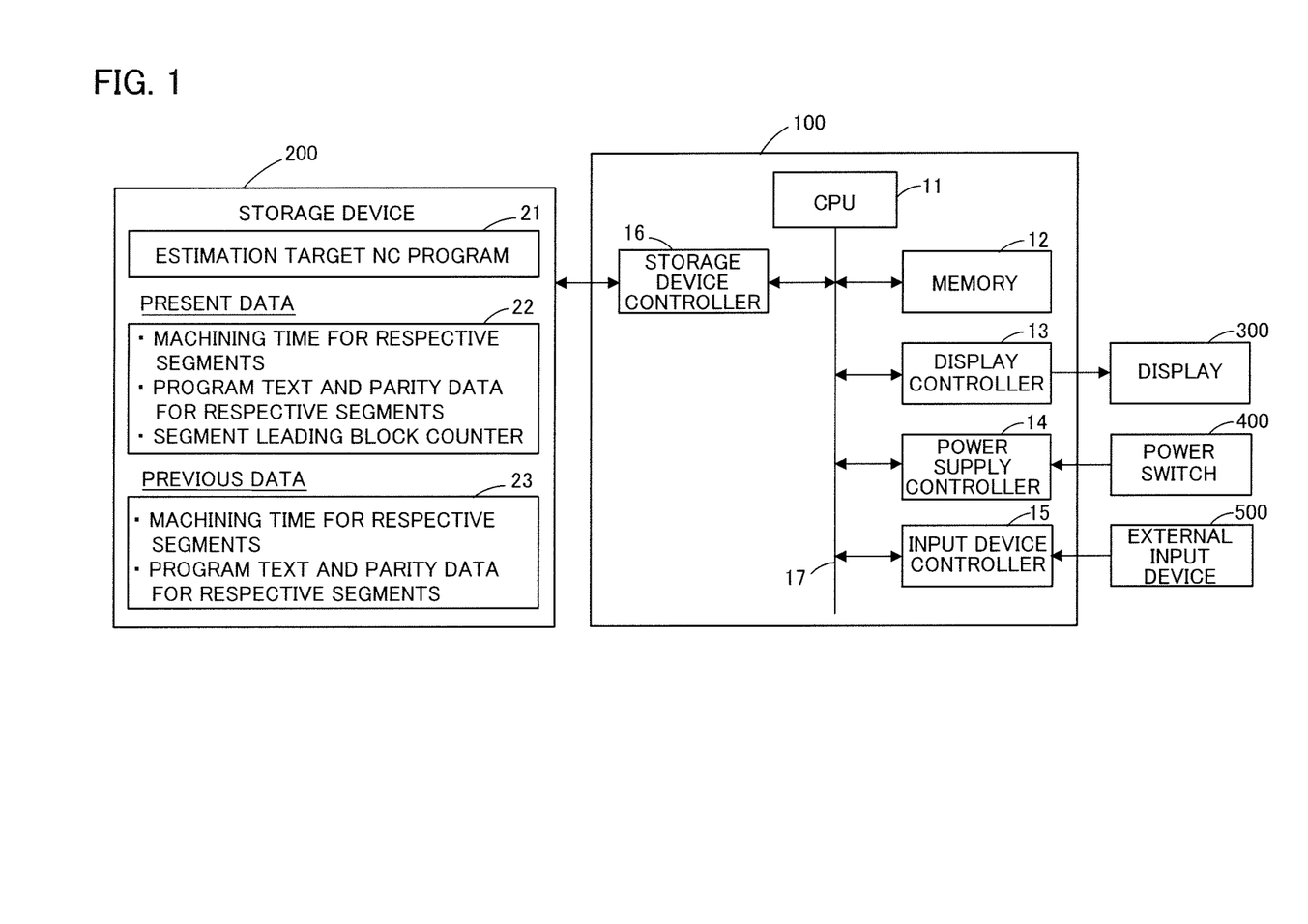
FIG. 1 is a block diagram of an arithmetic processing unit that forms a machining time estimating device according to the present invention.

An arithmetic processing unit 100 includes a CPU 11 which is a processor that performs arithmetic processing, a memory 12 such as a RAM or a ROM, a display controller 13 that controls a display 300, a power supply controller 14 that controls the power on/off of the arithmetic processing unit 100 according to an on/off signal from a power switch 400, an input device controller 15 that controls an external input device 500, and a storage device controller 16 that controls a storage device 200. These components 12, 13, 14, 15, and 16 are connected to the CPU 11 via a bus 17.

The memory 12 is a storage unit that stores various items of data input from the outside via the storage device 200, the external input device 500, and the like and stores a control program therein. An example of the external input device 500 includes a keyboard and the like, and input data from the external input device 500 is input to the arithmetic processing unit 100 via the input device controller 15. The storage device controller 16 controls the input and output of data to and from the storage device 200.

The storage device 200 stores an estimation target NC program 21, a present data area 22, and a previous data area 23, which are read into and used by the arithmetic processing unit 100 via the storage device controller 16 in a machining time estimation process.

Figure 2:
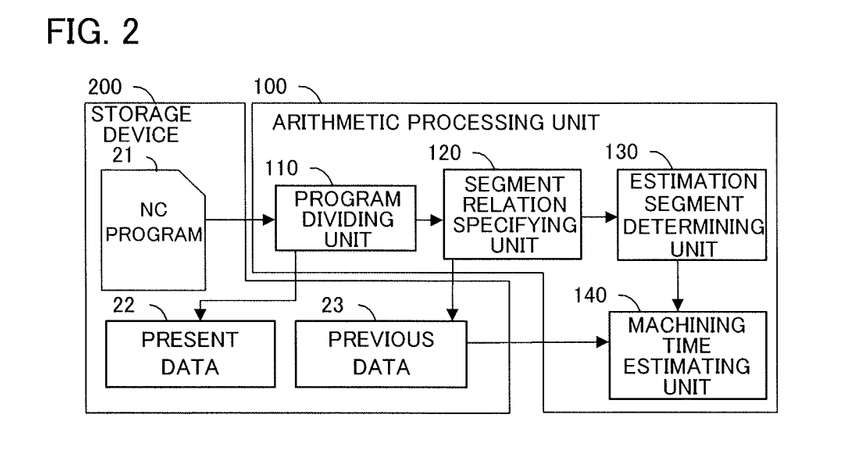
FIG. 2 is a functional block diagram of the arithmetic processing unit that forms the machining time estimating device according to the present invention.

FIG. 2 is a functional block diagram of the arithmetic processing unit 100 that forms the machining time estimating device of the present invention.

The arithmetic processing unit 100 includes a program dividing unit 110, a segment relation specifying unit 120, an estimation segment determining unit 130, and a machining time estimating unit 140.

The program dividing unit 110 performs a process of processing the estimation target NC program 21 read from the storage device 200 in units of blocks and determining "segment start conditions" to separate the estimation target NC program 21 into segments of a plurality of blocks and stores the segments in the present data area 22 of the storage device 200 as segment information. Moreover, the program dividing unit 110 checks the present data area 22 of the storage device 200, and, when the segment information is already recorded, moves the recorded segment information to the previous data area 23.

Here, the "segment start conditions" are conditions for dividing respective segments that form the NC program. In the present embodiment, the following blocks in the NC program are defined as the "segment start conditions".

Start of program;
Block including auxiliary code (M, S, T, and B);
Subprogram call
Comment block including specific keyword
Mask-buffered block (for example, G4.1, G31, G53, and M-codes, which are command blocks in which buffering of subsequent blocks of the corresponding block is inhibited until the block ends)

The program dividing unit 110 divides the NC program into blocks corresponding to the respective "segment start conditions" and records the divided NC program texts in the present data area 22 as the segment information together with the following items.

[Segment Information Item 1]
Program text of leading block

[Segment Information Item 2]
Present position at the start of execution of leading block (when the leading block is mask-buffered only)

[Segment Information Item 3]
Parity information of NC program text of corresponding segment Here, the program text of the leading block of the segment information item 1 is the program text of a leading block of the corresponding segment itself and is a text which includes a program name, the name of a called subprogram, and the like and which is uniquely determined in one NC program. Moreover, the present position at the start of execution of the leading block of the segment information item 2 is position information of respective control axes of a control target machine when the execution of the leading block of the corresponding segment starts. Further, the parity information of the segment information item 3 is parity information calculated based on the texts of the NC program corresponding to the divided respective segments. It is assumed that the parity information has such a parity length that it can be identified that the NC program has been modified from the parity information calculated from the NC program after modification when the NC program of the segment is modified and the parity information calculated from the NC program before modification. Optional information may be used as the parity information as long as it can be identified that the NC program of the segment has been modified. For example, a check sum, a CRC, a one-directional hash function, and the like may be used as the parity information.

The segment relation specifying unit 120 retrieves, from the previous data area 23 of the storage device 200, segment information that is regarded to be identical to respective items of segment information of the present data obtained by the program dividing unit 110.

Respective items of segment information of the estimation target NC program before modification, created before the NC program has been modified, are recorded in the previous data area 23. Moreover, the previously estimated machining time of respective segments is recorded in the previous data area 23 in correlation with the respective items of segment information. When the segments of previous data that are regarded to be identical to the respective segments of the present data are retrieved, the "program text of leading block" of the segment information item 1 or the "present position at the start of execution of leading block" (when the leading block itself is edited) of the segment information item 2 is used as a retrieval key.

The estimation segment determining unit 130 compares the "parity information" of the segment information item 3 of the present data with that of the previous data with respect to the items of segment information which are regarded to be identical to that of the present data and have been retrieved by the segment relation specifying unit 120 and determines a segment of which the parity information does not match as a machining time estimation requiring segment. Moreover, the estimation segment determining unit 130 compares the program text of the segment of which the parity information does not match to specify a modified block. When the block in which a mismatch occurs in the text due to modification has a command which affects the operation of a subsequent block, the estimation segment determining unit 130 also determines the subsequent segment as the machining time estimation requiring segment.

Figure 3:
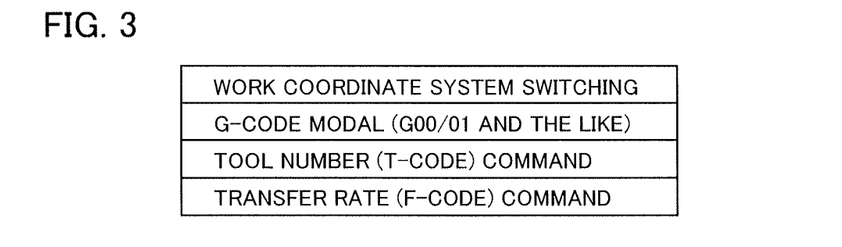
FIG. 3 is a diagram illustrating commands that affect the operation of an NC program in a subsequent block.

The following commands illustrated in FIG. 3 are examples of a command which affects the operation of a subsequent block when a block of the NC program is modified.

The machining time estimating unit 140 estimates the machining time in the segment that the estimation segment determining unit 130 has determined as the machining time estimation requiring segment. Moreover, the estimated machining time of the segments which are regarded to be identical and are retrieved from the previous data area 23 is used for the segments other than the machining time estimation requiring segment. All of these estimated machining time periods are added and output as a total estimated machining time of the present NC program, which is recorded in the storage device 200.

In the machining time estimation process, the machining time estimation algorithm disclosed in Japanese Patent Application Laid-Open No. 2012-93975 mentioned above, and other known machining time estimation algorithms can be used.

The machining time estimation process performed with the configuration of the present invention will be described based on the respective embodiments below.

Figure 4:
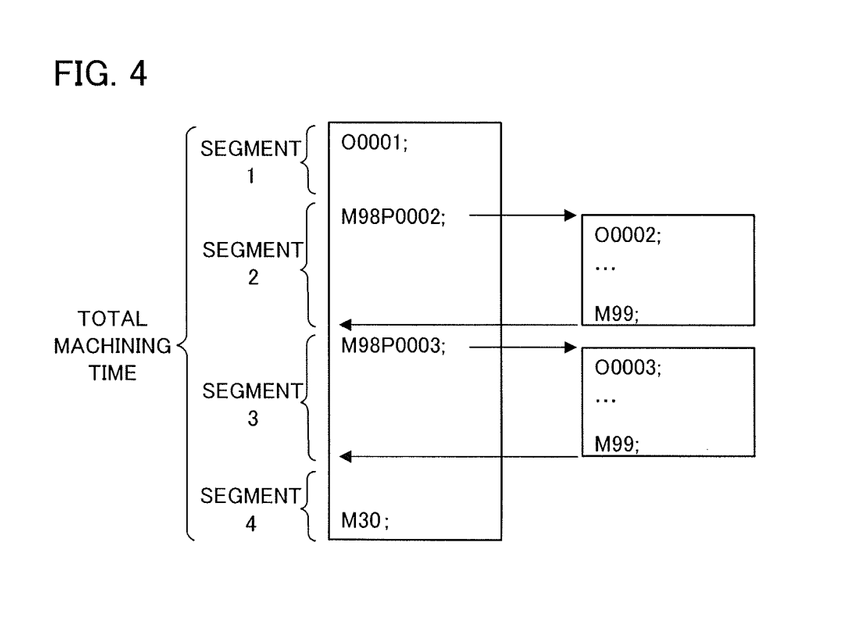
FIG. 4 is a diagram for describing a program configuration of a machining time estimation target program used by the arithmetic processing unit of FIG. 2.

FIG. 4 is a diagram for describing a program configuration of a machining time estimation target program used by the arithmetic processing unit 100 of FIG. 2.

As illustrated in FIG. 4, in the respective embodiments described below, an NC program that reads two subprograms O0002 and O0003 from a main program O0001 is used as the machining time estimation target program. In the respective embodiments, a case in which the arithmetic processing unit 100 of FIG. 2 estimates the machining time according to the NC program illustrated in FIG. 4, records the respective segment of the NC program as segment information, and estimates the machining time again after the NC program is modified once will be described.

Figure 5:
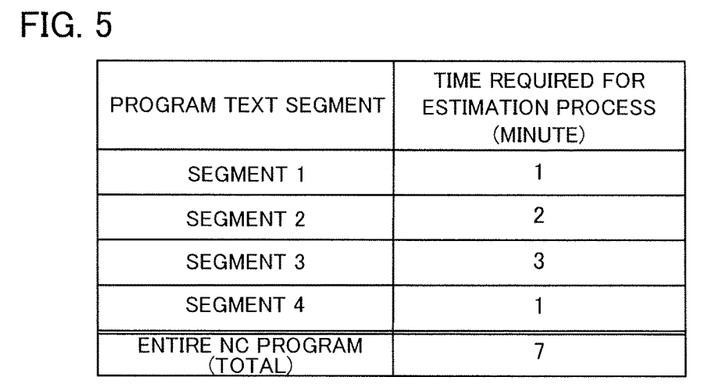
FIG. 5 is a table illustrating the time required for the first machining time estimation process with respect to respective segments of the NC program of FIG. 4.

FIG. 5 is a table illustrating the time required for the first machining time estimation process with respect to the respective segments of the NC program of FIG. 4.

In the embodiments of the present invention, since the machining time estimation algorithm of the related art is used, the time required for the machining time estimation process of the machining time estimation algorithm illustrated in FIG. 5 is the same as that of the machining time estimation process of the related art.

In general, when the number of blocks changes with modification of an NC program, the time required for the machining time estimation process according to the machining time estimation algorithm changes by the amount of modification. However, in the description of the following embodiments, in order to make the features of the present invention easily understood, it is assumed that the NC program is modified on a small scale and the time required for the machining time estimation process according to the machining time estimation algorithm does not change substantially before and after editing.

Figure 6:
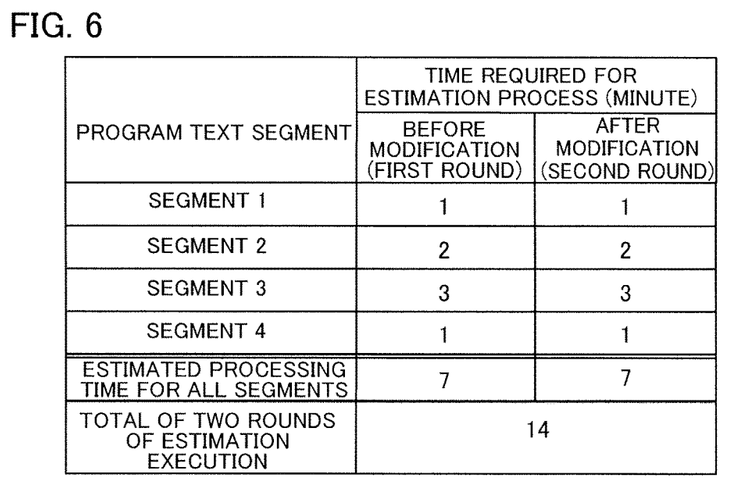
FIG. 6 is a table illustrating the time required for respective machining time estimation processes when a machining time estimation process is executed before and after modification using a machining time estimation algorithm of the related art.

FIG. 6 is a table illustrating the time required for respective machining time estimation processes when a machining time estimation process is executed before and after modification using the machining time estimation algorithm of the related art.

As illustrated in FIG. 6, when the machining time estimation process of the related art is performed on the NC program before and after modification, since the machining time estimation process is executed for all segments including both before and after modification modification, the machining time estimation process after modification requires time the same as the machining time estimation process before modification. In the machining time estimation process on the NC program of FIG. 4, it is assumed that the machining time estimation processes before and after modification require the processing time of 7 minutes and a total time required for the machining time estimation process is 14 minutes.

Figure 7:
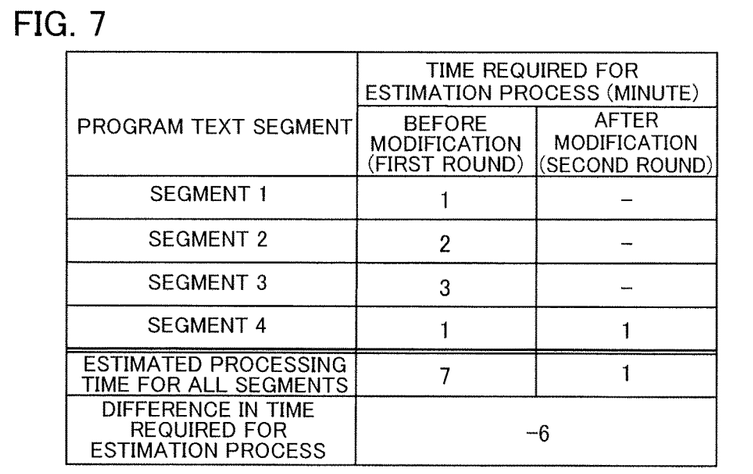
FIG. 7 is a diagram illustrating the time required for estimation (first embodiment) of the machining time according to the NC program, executed by the arithmetic processing unit of FIG. 2.

A first embodiment of a machining time estimation process according to the NC program, executed by the arithmetic processing unit 100 of FIG. 2, will be described with reference to FIGS. 7 and 8.

In the first embodiment of the machining time estimation process according to the NC program, it is assumed that the segment 4 of the NC program illustrated in FIG. 4 is modified. In such a case, in the machining time estimation process on the NC program after modification, of the arithmetic processing unit 100, a re-estimation process is not executed on the segments 1, 2, and 3 of which the program texts are not changed, but the machining time estimation process is executed on a segment 4 only of which the program text is changed. Thus, as illustrated in the table of FIG. 7, the time required for the machining time estimation process is approximately 0 (minutes) for the segments 1 to 3, and the time required for the second machining time estimation process is shortened by 6 minutes as compared to the time required for the first machining time estimation process.

Figure 8:
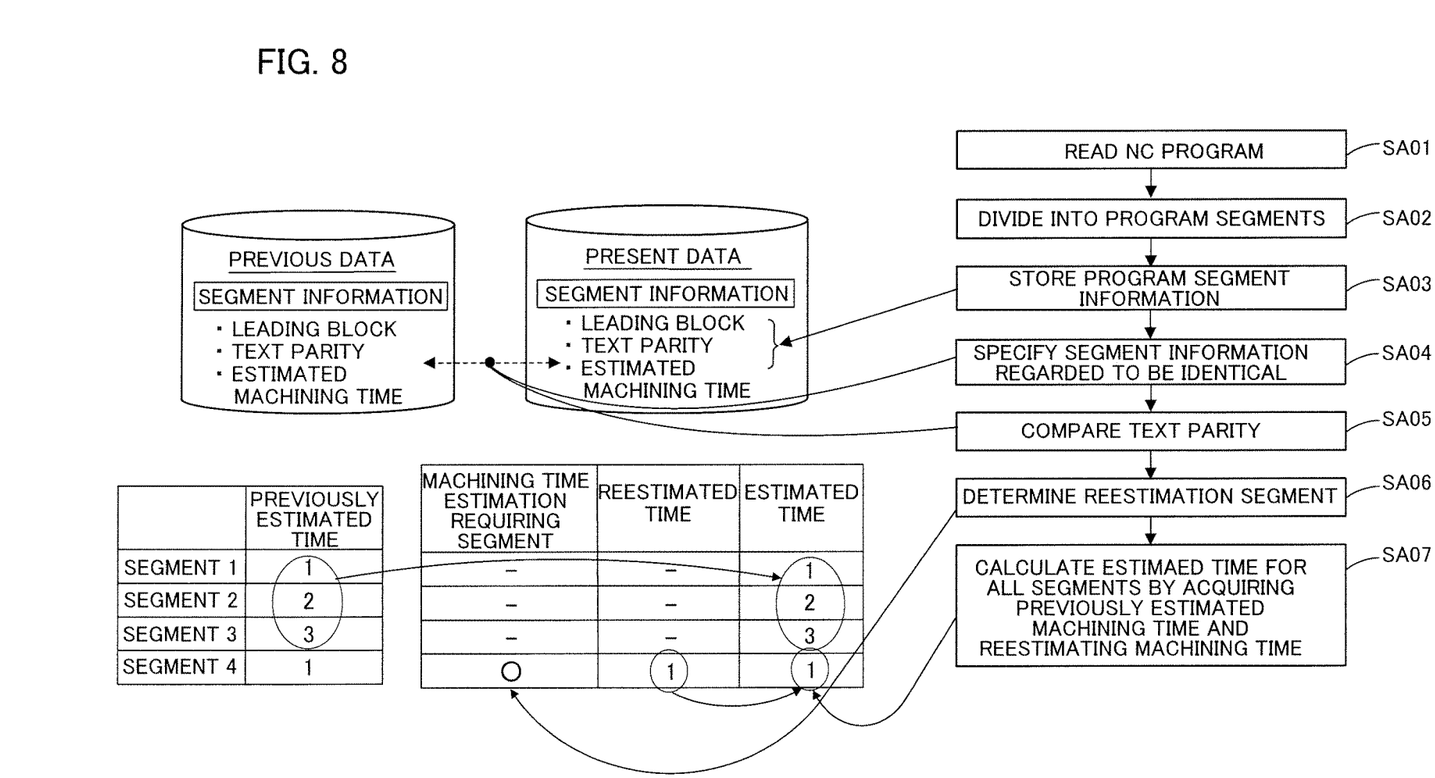
FIG. 8 is a diagram for describing the flow of a machining time estimation process (first embodiment) according to the NC program after modification, executed by the arithmetic processing unit of FIG. 2.

FIG. 8 is a diagram for describing the flow of the machining time estimation process (first embodiment) according to the NC program after modification.
[Step SA01]
After modifying an NC program, when an operator instructs the arithmetic processing unit 100 to execute a machining time estimation process, the program dividing unit 110 reads an estimation target NC program 21 from the storage device 200.
[Step SA02]
The program dividing unit 110 executes a dividing process on the read NC program 21 to divide the NC program 21 into segments 1 to 4 and generates segment information for the respective divided segments.
[Step SA03]
The program dividing unit 110 records the segment information generated for the respective segments of the divided NC program 21 in the present data area 22 of the storage device 200.
[Step SA04]
The segment relation specifying unit 120 retrieves the segment information recorded in the previous data area 23 using the leading block texts of the respective items of segment information recorded in the present data area 22 and specifies segment information which is recorded in the previous data area 23 and is regarded to be identical to each of the segments recorded in the present data area 22.
[Step SA05]
The segment relation specifying unit 120 compares the text parity information of the respective items of segment information recorded in the present data area 22 with the text parity information of the segment information which has been specified in step SA04 as being regarded to be identical to each of the respective items of segment information to specify a modified segment (the segment 4 in the present embodiment).
[Step SA06]
The estimation segment determining unit 130 determines the modified segment 4 specified in step SA05 as a machining time estimation requiring segment.
[Step SA07]
The machining time estimating unit 140 acquires the previously estimated time of the segments 1 to 3 and executes a machining time estimation process based on the machining time estimation algorithm for the segment 4 determined as the machining time estimation requiring segment to calculate the estimated time for all segments.

As described above, in the present embodiment, the machining time estimation process is shortened by reutilizing the previous machining time estimation results for the segments 1 to 3 other than the modified segment 4.

A second embodiment of a machining time estimation process according to the NC program, executed by the arithmetic processing unit 100 of FIG. 2 will be described with reference to FIGS. 9 to 12.

In the present embodiment, it is assumed that the segment 3 of the NC program illustrated in FIG. 4 is modified.

Figure 9:
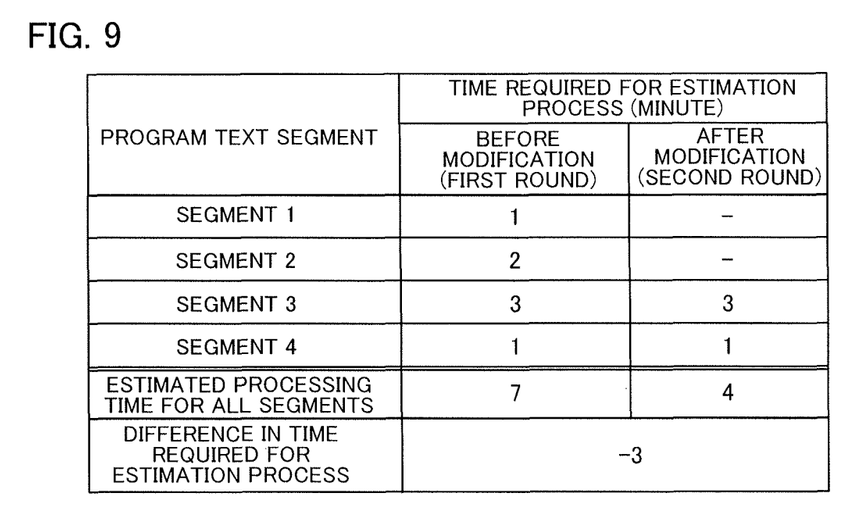
FIG. 9 is a diagram illustrating the time required for estimation (second embodiment) of the machining time according to the NC program, executed by the arithmetic processing unit of FIG. 2 when an extent of impact affected by modification is present.

Here, when a modified block of the segment 3 includes a command (FIG. 3) that affects the operation based on the program of the subsequent segment 4, in the machining time estimation process on the NC program after modification, carried out by the arithmetic processing unit 100 of FIG. 2, the re-estimation process is not executed on the segments 1 and 2 of which the program texts have not been changed, and the machining time estimation process is executed on only the segment 3 of which the program text has been changed and the segment 4 which is affected by the modification of segment 3. Thus, as illustrated in the table of FIG. 9, the time required for the machining time estimation process is approximately 0 (minutes) for the segments 1 and 2, and the time required for the second machining time estimation process is shortened by 3 minutes as compared to the time required for the first machining time estimation process.

Figure 10:
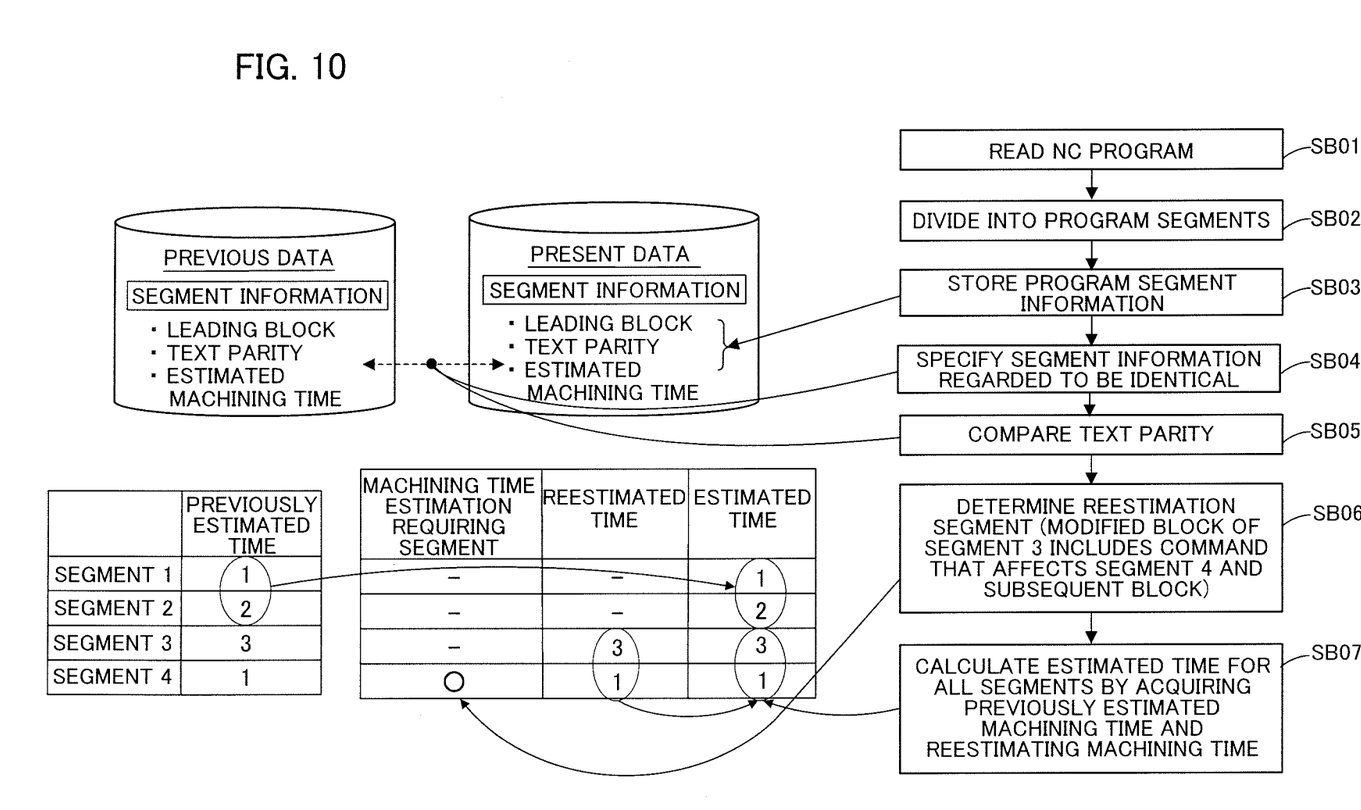
FIG. 10 is a diagram for describing the flow of a machining time estimation process (second embodiment) according to the NC program, executed by the arithmetic processing unit of FIG. 2 when an extent of impact affected by modification is present.

FIG. 10 is a diagram for describing the flow of the machining time estimation process (second embodiment) according to the NC program after modification.
[Step SB01]
After modifying an NC program, when an operator instructs the arithmetic processing unit 100 to execute a machining time estimation process, the program dividing unit 110 reads an estimation target NC program 21 from the storage device 200.
[Step SB02]
The program dividing unit 110 executes a dividing process on the read NC program 21 to divide the NC program 21 into segments 1 to 4 and generates segment information for the respective divided segments.
[Step SB03]
The program dividing unit 110 generates segment information for the respective segments of the divided NC program 21 and records the segment information in the present data area 22 of the storage device 200.

[Step SB04]

The segment relation specifying unit 120 retrieves the segment information recorded in the previous data area 23 using the leading block texts of the respective items of segment information recorded in the present data area 22 and specifies segment information which is recorded in the previous data area 23 and is regarded to be identical to each of the segments recorded in the present data area 22.

[Step SB05]

The segment relation specifying unit 120 compares the text parity information of the respective items of segment information recorded in the present data area 22 with the text parity information of the segment information which has been specified in step SB04 as being regarded to be identical to each of the respective items of segment information to specify a modified segment (the segment 3 in the present embodiment).

[Step SB06]

The estimation segment determining unit 130 determines the modified segment 3 specified in step SB05 as a machining time estimation requiring segment. Moreover, the estimation segment determining unit 130 compares the program texts of the segment concerned, detects the fact that the modified part of the segment 3 includes a command that affects the subsequent segment, and determines the subsequent segment 4 of the segment 3 as the machining time estimation requiring segment.

[Step SB07]

The machining time estimating unit 140 acquires the previously estimated time of the segments 1 and 2 and executes a machining time estimation process based on the machining time estimation algorithm for the segments 3 and 4 determined as the machining time estimation requiring segment to calculate the estimated time for all segments.

Figure 11:
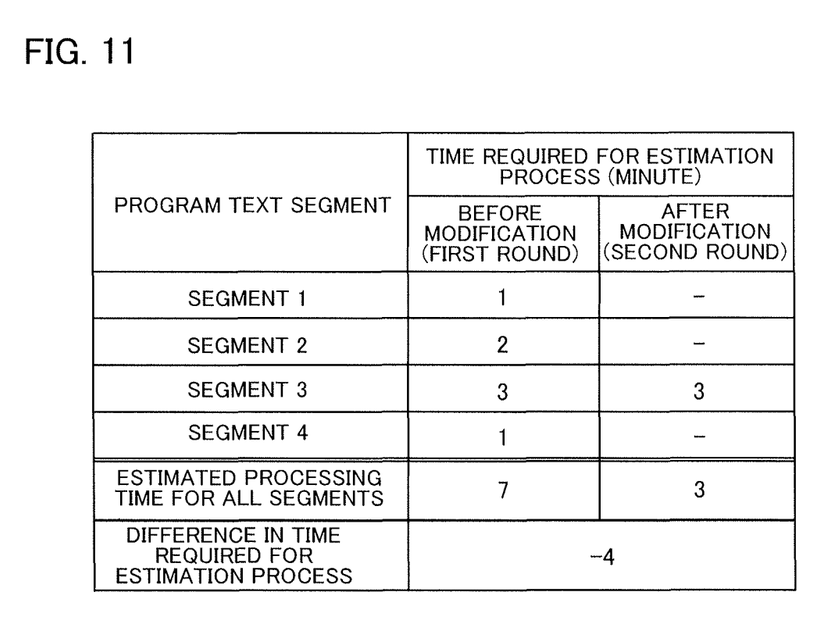
FIG. 11 is a diagram illustrating the time required for estimation (second embodiment) of the machining time according to the NC program, executed by the arithmetic processing unit of FIG. 2 when an extent of impact affected by modification is not present.

Moreover, similarly, when the segment 3 is modified and a modified block of the segment 3 does not include a command (FIG. 3) that affects the operation based on the program of the subsequent segment 4, in the machining time estimation process on the NC program after modification, carried out by the arithmetic processing unit 100, the re-estimation process is not executed on the segments 1, 2, and 4 of which the program texts have not been changed, and the machining time estimation process is executed on the segment 3 only of which the program text has been changed. Thus, as illustrated in the table of FIG. 11, the time required for the machining time estimation process is approximately 0 (minutes) for the segments 1, 2, and 4, and the time required for the second machining time estimation process is shortened by 4 minutes as compared to the time required for the first machining time estimation process.

Figure 12:
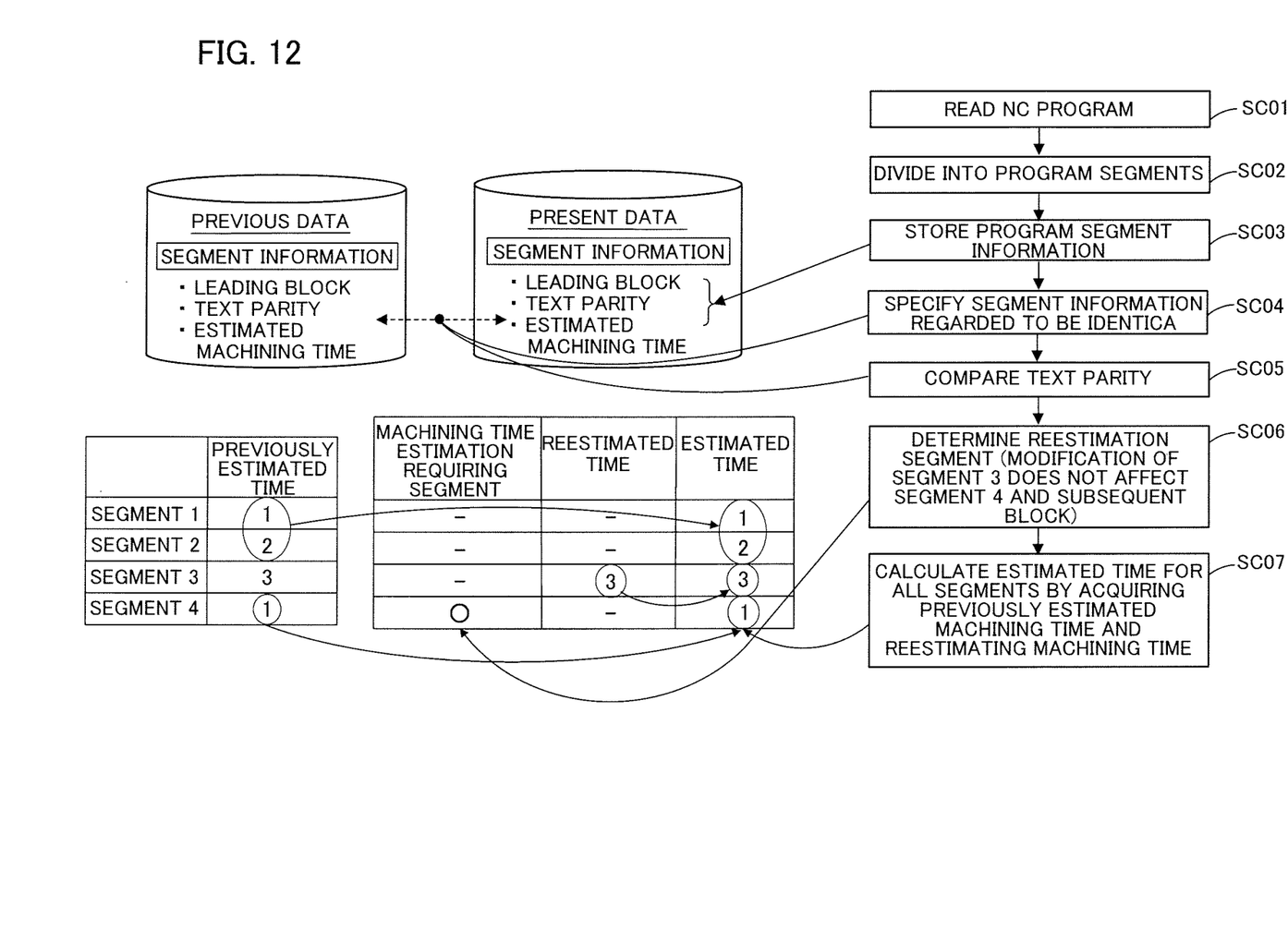
FIG. 12 is a diagram for describing the flow of a machining time estimation process (second embodiment) according to the NC program, executed by the arithmetic processing unit of FIG. 2 when an extent of impact affected by modification is not present.

FIG. 12 is a diagram for describing the flow of the machining time estimation process (second embodiment) according to the NC program after modification.

[Step SC01]

After modifying an NC program, when an operator instructs the arithmetic processing unit 100 to execute a machining time estimation process, the program dividing unit 110 reads an estimation target NC program 21 from the storage device 200.

[Step SC02]

The program dividing unit 110 executes a dividing process on the read NC program 21 to divide the NC program 21 into segments 1 to 4 and generates segment information for the respective divided segments.

[Step SC03]

The program dividing unit 110 records the segment information generated for the respective segments of the divided NC program 21 in the present data area 22 of the storage device 200.

[Step SC04]

The segment relation specifying unit 120 retrieves the segment information recorded in the previous data area 23 using the leading block texts of the respective items of segment information recorded in the present data area 22 and specifies segment information which is recorded in the previous data area 23 and is regarded to be identical to each of the segments recorded in the present data area 22.

[Step SC05]

The segment relation specifying unit 120 compares the text parity information of the respective items of segment information recorded in the present data area 22 with the text parity information of the segment information which has been specified in step SC04 as being regarded to be identical to each of the respective items of segment information to specify a modified segment (the segment 3 in the present embodiment).

[Step SC06]

The estimation segment determining unit 130 determines the modified segment 3 specified in step SC05 as a machining time estimation requiring segment. Here, the estimation segment determining unit 130 compares the program text of the segment concerned, detects the fact that the modified part of the segment 3 does not include a command that affects the subsequent segment, and determines the modified segment 3 only as the machining time estimation requiring segment.

[Step SC07]

The machining time estimating unit 140 acquires the previously estimated time of the segments 1 and 2 and executes a machining time estimation process based on the machining time estimation algorithm for the segments 3 and 4 determined as the machining time estimation requiring segment to calculate the estimated time for all segments.

As described above, in the present embodiment, it is detected whether or not the modification of the segment affects the subsequent segment and the machining time estimation process is executed only on the segment in which estimation of the machining time is required. Thus, it is possible to shorten the machining time estimation process.

A third embodiment of the machining time estimation process according to the NC program, executed by the arithmetic processing unit 100 of FIG. 2 will be described with reference to FIG. 13.

In the present embodiment, it is assumed that, in the NC program illustrated in FIG. 4, the leading block of the segment 3 is modified from "M98P0003" to "M98P0004".

In such a case, since the leading block itself of the segment 3 is changed, it is not possible to specify the segment information which is regarded to be identical to the segment 3 from the previous data area 23 based on "program text of leading block" of the segment information item 1. However, since the leading block of the segment 3 includes an M-code (a command block that is mask-buffered), the "present position at the start of execution of leading block" of the segment information item 2 is recorded in the segment information of the segment 3. Thus, it is possible to specify a segment which is regarded to be identical to the segment in the previous data area 23 by using the "present position at the start of execution of leading block" of the segment information item 2.

In most cases, since the cutting path in machining does not pass through the same position, when execution of the NC program on segments starts, if the "present position at the start of execution of leading block" of the segment information item is the same in two segments, it can be said that the segments are the same.

Moreover, if the present positions at the start of execution of the mask-buffered blocks are the same, since the mask-buffered blocks in the NC program will be few, it is possible to increase the guarantee of the identicalness that the blocks belong to the same segments.

Figure 13:
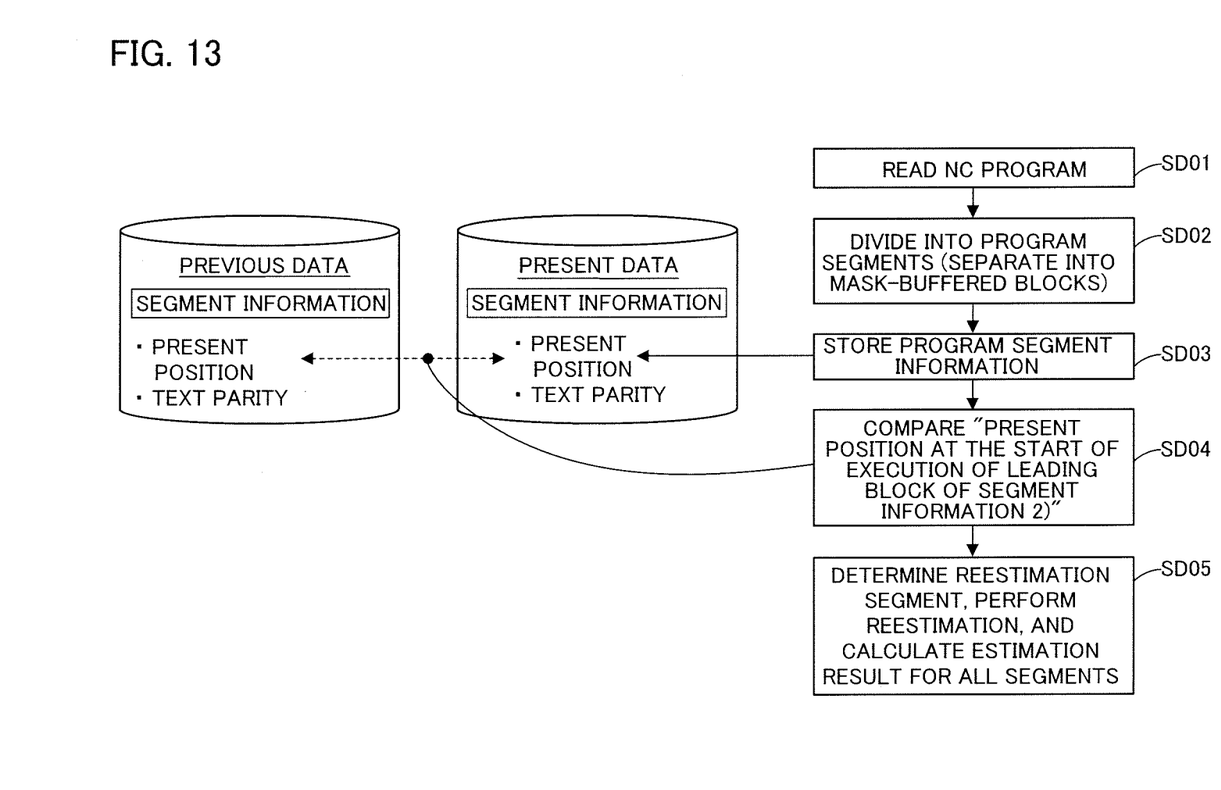
FIG. 13 is a diagram for describing the flow of a machining time estimation process (third embodiment) according to the NC program, executed by the arithmetic processing unit of FIG. 2.

FIG. 13 is a diagram for describing the flow of the machining time estimation process (third embodiment) according to the NC program after modification.

[Step SD01]

After modifying an NC program, when an operator instructs the arithmetic processing unit 100 to execute a machining time estimation process, the program dividing unit 110 reads an estimation target NC program 21 from the storage device 200.

[Step SD02]

The program dividing unit 110 executes a dividing process on the read NC program 21 to divide the NC program 21 into segments 1 to 4. In this example, the "present position at the start of execution of leading block" of the segment information item 2 for the mask-buffered block is also generated as the segment information.

[Step SD03]

The program dividing unit 110 records the segment information generated for the respective segments of the divided NC program 21 in the present data area 22 of the storage device 200.

[Step SD04]

The segment relation specifying unit 120 retrieves the segment information recorded in the previous data area 23 using the "leading block text" of the segment information item 1 of the respective items of segment information recorded in the present data area 22 and specifies segment information which is recorded in the previous data area 23 and is regarded to be identical to each of the respective items of segment information recorded in the present data area 22. As for the segment of which the leading block is modified, the segment relation specifying unit 120 retrieves the segment information recorded in the previous data area 23 using the "present position at the start of execution of leading block" of the segment information item 2 of the respective items of segment information recorded in the present data area 22 and specifies segment information which is recorded in the previous data area 23 and is regarded to be identical to each of the respective items of segment information recorded in the present data area 22.

[Step SD05]

The segment relation specifying unit 120 determines a machining time estimation requiring segment and calculates the estimated time for all segments similarly to the first and second embodiments described above.

As described above, in the present embodiment, even when the leading block is modified, it is possible to specify a segment in which estimation of a machining time is required and to shorten the machining time estimation process by reutilizing the previous machining time estimation result.

What is claimed is:

1. A machining time estimating device that estimates a machining time required for a machine tool to machine a workpiece, the machine tool being controlled based on an NC program, the machining time estimating device comprising:
a storage unit that stores first segment information on a plurality of segments that forms a first NC program;
a program dividing unit that divides a second NC program modified based on the first NC program into a plurality of segments, and generates second segment information on the plurality of segments;
a segment relation specifying unit that specifies correlation between the plurality of segments that forms the first NC program and the plurality of segments that forms the second NC program, based on the first segment information and the second segment information;
an estimation segment determining unit that determines a machining time estimation target segment among the plurality of segments that forms the second NC program; and
a machining time estimating unit that estimates a machining time required for the machining of the machine tool controlled based on the second NC program, wherein
the first segment information includes an estimated machining time based on the plurality of segments for each of the plurality of segments that forms the first NC program, and
the machining time estimating unit is configured to estimate the machining time for a segment that is determined as the machining time estimation target segment by the estimation segment determining unit, and acquire the estimated machining time included in the first segment information with respect to segments that are determined as segments other than the machining time estimation target segment by the estimation segment determining unit, to thereby calculate a total machining time.

2. The machining time estimating device according to claim 1, wherein
each of the first and second items of segment information includes a leading program text of a segment corresponding to each of the first and second items of segment information, and
the segment relation specifying unit is configured to specify correlation between the plurality of segments that forms the first NC program and the plurality of segments that forms the second NC program, based on the leading program text.

3. The machining time estimating device according to claim 1, wherein
each of the first and second items of segment information includes an axial position of the machine tool at the start of execution of a leading block of a segment corresponding to each of the first and second items of segment information, and
the segment relation specifying unit is configured to specify correlation between the plurality of segments that forms the first NC program and the plurality of segments that forms the second NC program, based on the axial position of the machine tool at the start of execution of the leading block.

4. The machining time estimating device according to claim 1, wherein
each of the first and second items of segment information includes parity information of a program text of a segment corresponding to each of the first and second items of segment information, and the estimation segment determining unit is configured to determine the machining time estimation target segment based on the parity information of the program text of the segment corresponding to each of the first and second items of segment information.

5. The machining time estimating device according to claim 4, wherein the estimation segment determining unit is configured to determine the machining time estimation target segment based on a modification content of the second NC program in addition to the parity information of the program text of the segment corresponding to each of the first and second items of segment information.

6. The machining time estimating device according to claim 5, wherein the estimation segment determining unit is configured to determine the machining time estimation target segment based on the effect of a command corresponding to the modification content of the second NC program on a block subsequent to the command.

\* \* \* \* \*